United States Patent
Halim

(10) Patent No.: US 10,956,034 B2
(45) Date of Patent: Mar. 23, 2021

(54) AUTOMATIC VIRTUAL INPUT DEVICE

(71) Applicant: HEWLETT-PACKARD DEVELOPMENT COMPANY, L.P., Houston, TX (US)

(72) Inventor: Irwan Halim, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 23 days.

(21) Appl. No.: 16/091,055

(22) PCT Filed: Jul. 25, 2016

(86) PCT No.: PCT/US2016/043889
§ 371 (c)(1),
(2) Date: Oct. 3, 2018

(87) PCT Pub. No.: WO2018/021999
PCT Pub. Date: Feb. 1, 2018

(65) Prior Publication Data
US 2019/0138204 A1    May 9, 2019

(51) Int. Cl.
*G06F 15/16* (2006.01)
*G06F 3/0488* (2013.01)
(Continued)

(52) U.S. Cl.
CPC ........ *G06F 3/04886* (2013.01); *G06F 3/0236* (2013.01); *G06F 9/452* (2018.02); *G06F 9/455* (2013.01); *G06F 9/45533* (2013.01); *G06F 9/45558* (2013.01); *G06F 2009/45562* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS 9,830,175 B1 * 11/2017 Wagner ................ G06F 9/5077
2002/0075317 A1    6/2002 Dardick
(Continued)

FOREIGN PATENT DOCUMENTS

EP          2657837          10/2013
WO     WO-2011123840 A2     10/2011

OTHER PUBLICATIONS

Tabtip On-demand for Remote Desktop Automate the Keyboard Display From a Remote Desktop Session, 2013, < http://chessware.ch/tabtipod_rdp/ >.

*Primary Examiner* — Phyllis A Book
(74) *Attorney, Agent, or Firm* — Michael A. Dryja

(57) ABSTRACT

In one example, a method for a first computing environment (FCE) to automatically display a virtual input device on a display of a second computing environment (SCE) communicatively coupled to the FCE via a main channel. An auxiliary channel is established between the FCE and the SCE. A virtual input device preference is negotiated with the SCE over the auxiliary channel. A selection by the SCE, over the main channel, of an input element of an active FCE application associated with the SCE is detected. In response to the selection, a virtual input device in accordance with the device preference, operable by the SCE to input data to the input element, is automatically caused to be launched.

14 Claims, 9 Drawing Sheets

(51) Int. Cl.
*G06F 9/455* (2018.01)
*G06F 9/451* (2018.01)
*G06F 3/023* (2006.01)

(56) References Cited

U.S. PATENT DOCUMENTS

| | | | |
|---|---|---|---|
| 2008/0201306 A1* | 8/2008 | Cooper | H04M 3/527 |
| 2009/0106754 A1 | 4/2009 | Liu et al. | |
| 2011/0145278 A1* | 6/2011 | Maes | G06Q 10/06 |
| | | | 707/769 |
| 2011/0161482 A1 | 6/2011 | Bonola et al. | |
| 2011/0251868 A1* | 10/2011 | Mikurak | G06Q 10/06 |
| | | | 705/7.25 |
| 2012/0092277 A1* | 4/2012 | Momchilov | G06F 3/038 |
| | | | 345/173 |
| 2012/0226912 A1* | 9/2012 | King | G06F 21/31 |
| | | | 713/183 |
| 2012/0290702 A1* | 11/2012 | Vincent | G06F 9/4451 |
| | | | 709/223 |
| 2014/0214688 A1* | 7/2014 | Weiner | G06Q 20/3227 |
| | | | 705/71 |
| 2014/0214745 A1* | 7/2014 | Walsh | H04L 41/147 |
| | | | 706/46 |
| 2014/0320421 A1 | 10/2014 | Wei et al. | |
| 2015/0134833 A1* | 5/2015 | Kim | H04M 1/7253 |
| | | | 709/227 |
| 2015/0242087 A1 | 8/2015 | Elangovan et al. | |
| 2016/0110215 A1* | 4/2016 | Bonilla | G06F 9/45558 |
| | | | 718/1 |

\* cited by examiner

AUTOMATIC VIRTUAL INPUT DEVICE

BACKGROUND

Many computing devices today, such as tablet computers and smart phones for example, do not have a physical input device such as a keyboard. To enter alphanumeric information, and/or to perform other control functions, such devices often employ a virtual input device, such as for example a virtual keyboard. When an application executing on the device needs the user to provide the type of input than can be generated by such an input device—for example, a phone number, login information, or text for a memo—the virtual input device can be used.

DETAILED DESCRIPTION

Figure 1:
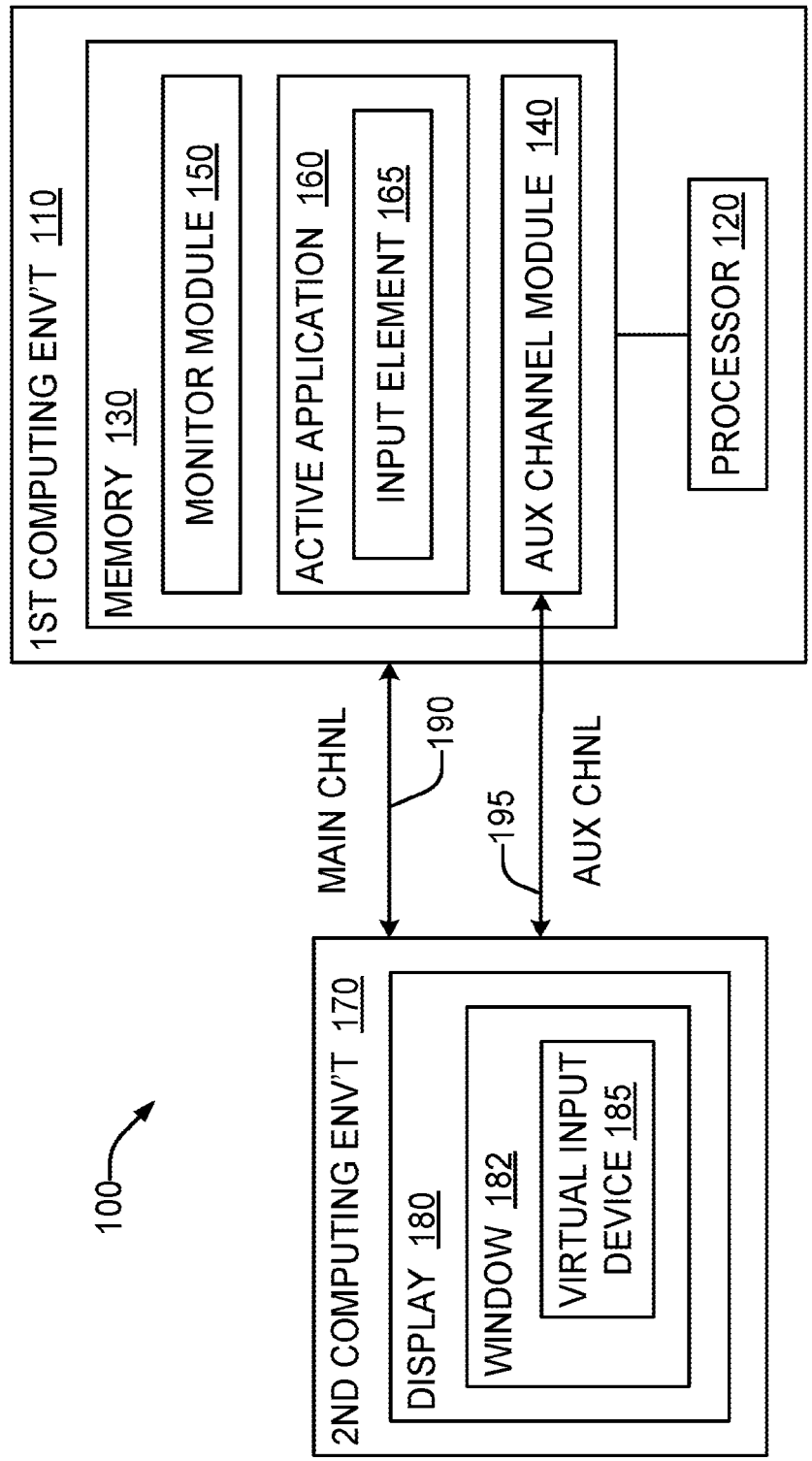
FIG. 1 is a schematic representation of a system in which a first computing environment automatically causes a virtual input device to be displayed on a second computing device in accordance with an example of the present disclosure.

It is advantageous for a virtual input device to be displayed automatically on a computing device when it is needed, without obtaining any additional interaction or assistance from a user in order to display it. For example, when a user selects a username field of an application running on the computing device (by, for example, touching the field on a touchscreen, or moving a mouse or trackball pointer to the field and clicking the selection button), the act of selecting the field would optimally bring up the virtual input device so that the user can enter the username. Similarly, if the user launches a memo application, the virtual input device would optimally be brought up automatically so that the user can enter the text of the memo.

However, in some computing configurations this cannot be done. One such configuration involves one computing environment, functioning as a client, conducting a remote desktop session with an application executing on a different computing environment that is functioning as a server. In this case, the two computing environments can be spaced at a distance and connected via a network. Another such configuration involves one computing environment, functioning as a host, running a desktop session of a different computing environment that is functioning as a guest. In this case, the two computing environments may be within a single computing device, with the guest computing environment executing as a virtual machine to the host.

In these configurations, the application which is executing on the client/host, displays an interactive window which is generated by a server program executing on the server/guest. The interactive window may appear to the user of the client/host to be a desktop of the server/guest. In the case of a server, the server may support simultaneous connections (or sessions) with different clients, each of which may be customized for that particular client. As the user interacts with the contents of the interactive window that is displayed on the client/host (for example by selecting icons or other elements of the window using touch, a mouse, etc.), these interactions are communicated from the client/host to the server/guest, which causes the server/guest to respond accordingly and then update the interactive window contents to reflect the results of the interactions.

Because the contents of the interactive window are determined by the server/guest and are not known to the client/host, the client/host does not know whether, or when, a virtual input device is needed and should be displayed. So if the user at the client/host selects, for example, the memo icon on the interactive window generated by the server/guest, the memo application of the server/guest will be displayed in the interactive window, but the virtual input device does not appear on the client/host display because the client/host does not know that the virtual input device is now needed.

Some types of operating systems have a server-side/guest-side virtual input device, such as a virtual keyboard. If a server/guest application, such as the memo application, knows that it has been initiated from a client/host, and knows that the server/guest operating system supports a server-side/guest-side virtual input device, it can request the server/guest operating system to display the server-side/guest-side virtual input device. The interactive window subsequently generated by the server/guest includes the server-side/guest-side virtual input device. The user at the client/host device can then interact with the displayed server-side/guest-side virtual input device by selecting its elements, such as the keys of a virtual keyboard.

However, in order to do this, the application being run on the server/guest needs to be aware that it could be running in a server/guest configuration, and/or that the server/guest operating system has a server-side/guest-side virtual input device. Many older applications do not have this awareness. If the memo application, for example, does not have this awareness, then the server-side/guest-side virtual input device will not be automatically displayed to the user at the client/host.

In addition, many older operating systems do not support a server-side/guest-side virtual input device. So even if the application running on the server/guest recognizes that it is running in a server/guest configuration and that a virtual input device is needed by the user of the client/host, the server/guest cannot display it.

According to the present disclosure, a first computing environment (FCE) can cause a virtual input device to be presented on the display of a second computing environment (SCE) when an input element of an application running on the first computing environment is selected by a user at the second computing environment, even if the operating system of the first computing environment does not support an FCE-side virtual input device and/or the application is not virtual input device-aware. In examples where the operating system of the first computing environment supports an FCE-side virtual input device, the FCE-side virtual input device may be displayed regardless of whether the application running on the server is virtual input device-aware. In examples where the operating system of the first computing environment does not supports an FCE-side virtual input device, the first computing environment can cause the SCE-side virtual input device to be displayed.

An auxiliary channel is established between the first computing environment and the second computing environment. This auxiliary channel is different from a main channel communications connection between the first computing environment and the second computing environment by which the two computing environments communicate in order to present on a display of the second computing environment an interactive window of an application executing on the first computing environment. The two computing environments negotiate over the auxiliary channel to determine the virtual input device capabilities of both environments, and to establish a priority order in which virtual input devices are to be used. A monitor module on the first computing environment detects selection on the second computing environment of an input element of the application executing on the first computing environment. If the FCE-side virtual input device is the highest-priority existing virtual input device, then the FCE-side virtual input device will be automatically launched by the monitor module upon the selection without further action being taken by the user of the second computing environment. If the SCE-side virtual input device is the highest-priority existing virtual input device, then the monitor module will send an instruction to the second computing environment over the auxiliary channel to automatically launch the SCE-side virtual input device without further action being taken by the user of the second computing environment.

One core concept of the present disclosure represents computer technology that is advantageous, compared to what has been done previously, for remote client-server desktop sessions conducted using a client device which does not have a physical keyboard or other such physical input device, and for the virtualization of a guest environment on a host device.

By automatically causing a virtual input device to be launched in response to the user selecting an input element displayed in an interactive window on a client device or a host device even if the application and/or the operating system executing on the server or guest environment does not have the capability to do so, the user can continue to work without interruption or delay. User frustration, and interruption of their train of thought, occurs if the user selects an input element but the virtual input device is not automatically displayed. In such a situation, where the interactive window is being displayed full-screen on the client or host as is often the case, the user first has to reduce or minimize that window. Then the user needs to locate the icon for the virtual input device on the client or host. This involves visual scanning of the display by the user, and may also involve the user swiping through multiple screens in order to locate the proper icon. Then after the user has manually located and selected the icon to launch the virtual input device, he or she returns back to the reduced or minimized interactive window and once again maximizes it. Finally, after all this, the virtual input device is ready for use. At this point, the user needs to recover from the interruptions to his or her train of thought in order to perform the task they intended in the first place when they selected the input element of the interactive window.

Compare this operation to that of the present disclosure. According to the present disclosure, the user selects an input element displayed on the client or host display, and the virtual input device automatically appears. The user can immediately input the desired information and continue with his work, without any delay or interruption. Furthermore, the present disclosure enables this to be done whether or not the server/guest operating system, and/or the application running on the server/guest and being interacted with by the user, supports and/or is aware of virtual input devices.

Considering now a system having communicating computing environments, and with reference to FIG. 1, a system 100 includes a first computing environment (FCE) 110 communicatively coupled to a second computing environment (SCE) 170. The FCE 110 and the SCE 170 communicate over a main channel 190 and a different auxiliary channel 195. The FCE 110 presents an interactive window to the SCE 170, and the SCE 170 communicates selections and other interactions by a user of the SCE 170 to the FCE 110 over the main channel 190. The FCE 110 and the SCE 170 conduct negotiations virtual input device display preferences over the auxiliary channel 195.

The FCE 110 includes a processor 120 communicatively coupled to a memory 130. The memory 130 includes program instructions, which are executable by the processor 120, for various modules. One module is an active application 160 executing on the FCE 110. Active application 160 includes an input element 165, displayed in a window, which can be selected by the user at the SCE 170 to allow the user to provide input, such as alphanumeric text for example. Another module is an auxiliary channel module 140 which establishes the auxiliary channel 195 between the FCE 110 and the SCE 170, and negotiates the virtual input device display preferences with the SCE 170. A further module is a monitor module 150. The monitor module 150 detects a selection, by the SCE 170 over the main channel 190, of an input element 165 of an active application 160 executing on the FCE 110 and displayed in an interactive window 182 of the SCE 170. In response to the selection, the monitor module 150 automatically causes a virtual input device 185, in accordance with the display preferences, to be displayed on a display 180 of the SCE 170. In one example, the monitor module 150 automatically causes a virtual input device of the SCE 170 to be launched and presented to user by signaling the SCE 170 over the auxiliary channel 195 to launch the virtual input device. In another example, the monitor module 150 automatically causes a virtual input device of the FCE 110 to be launched and presented to the SCE 170 over the main channel 190. Once the virtual input device has been launched, the user at the SCE 170 can then interact with the virtual input device 185 to provide the desired input to the FCE 110.

In one example, and as will be discussed subsequently with reference to FIG. 2, the FCE 110 is a server computer 260, the SCE 170 is a client computer 210 which is communicatively coupled to the FCE 110 over a network, and the main channel 190 uses a remote desktop communications protocol (RDCP). In one example, the RDCP implements a remote desktop session between the FCE 110 and the SCE 170 which enables a user, at the SCE 170, to interact with and operate a desktop of the FCE 110 which is presented to the SCE 170 by the FCE 110. As is discussed subsequently, RDCP is not Microsoft RDP (remote desktop protocol), but Microsoft RDP is one example of an RDCP.

In another example, and as will be discussed subsequently with reference to FIG. 3, the SCE 170 is a host computing environment, and the FCE 110 is a guest computing environment virtualized (i.e. a virtual machine) within the SCE 170. In one example, the main channel 190 enables the FCE 110 and the SCE 170 to communicate over a socket interface to enable a user, at the SCE 170, to interact with and operate a desktop of the FCE 110 which is presented to the SCE 170 by the FCE 110.

Accordingly, the FCE 110 may be considered to be a "desktop interaction computing environment" (DICE) and the SCE 170 may be considered to be a "desktop presentation computing environment" (DPCE).

Figure 2:
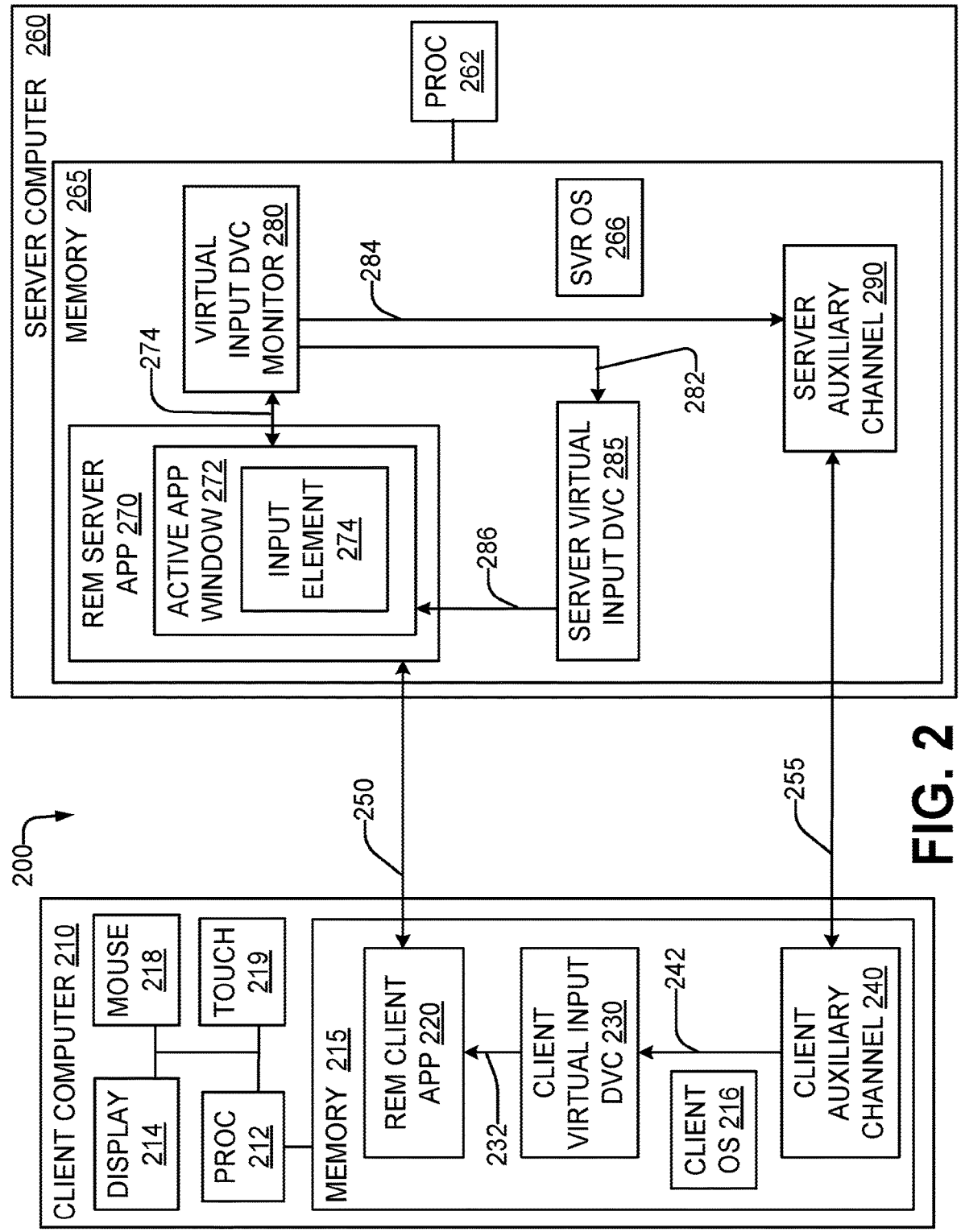
FIG. 2 is a schematic representation of the system of FIG. 1 in which the first computing environment is a server computer and the second computing environment is a client computer in accordance with an example of the present disclosure.

Considering now a client-server system and with reference to FIG. 2, a system 200 includes a client computer 210 communicatively coupled to a server computer 260, in some examples via a network (not shown).

The client computer 210 includes a processor 212, which is coupled to a display 214, a mouse 218, a touch screen 219, and a memory 215. In some examples, the client computer 210 also includes a physical input device (not shown) which is also coupled to the processor 212. The memory 215 includes program instructions, which are executable by the processor 212, for various program modules, including a client operating system (client OS) 216 which may initiate and provide resources to other program modules in the client memory 215. The server computer 260 includes a processor 262 and a memory 265. The memory 265 includes program instructions, which are executable by the processor 262, for various program modules, including a server operating system (server OS) 266 which may initiate and provide resources to other program modules in the server memory 265.

In some examples, the client OS 216 and the server OS 266 are different. For example, one OS may be Windows XP, while another OS may be Windows 10. Or one OS may be Windows 7, while another OS may be Linux. In some examples, the client OS 216 and the server OS 266 have different platforms. A platform may be defined as an underlying technology of the operating system and/or the computer architecture. For example, Windows, Linux, OS X, iOS, and Android are operating systems which have different underlying technologies and thus are considered herein as having different platforms. As another example, ARM, X86, and 64-bit machines have different underlying technologies and thus are considered herein as having different platforms. Furthermore, different platforms may be developed and/or supplied by different manufacturers, such as Microsoft and Apple.

The client memory 215 includes a remote client application 220, and the server memory 265 includes a remote server application 270. The remote client application 220 and the remote server application 270 communicate over a main channel 250 which employs a remote desktop communications protocol (RDCP). A non-limiting list of example RDCPs include Microsoft RDP, Citrix ICA, and Teredici PCoIP. A non-limiting list of example remote client applications 220 and remote server applications 270 include Microsoft Remote Desktop Services/Terminal Services, and Citrix XenDesktop/XenServer. Various remote client applications 220 and remote server applications 270 operate with various operating systems.

In one example, the RDCP implements, through connection 250, a remote desktop session between the remote client application 220 and the remote server application 270. While the particulars may vary for different remote client applications 220 and remote server applications 270, in a remote desktop session the remote server application 270 generally sends an interactive window of a desktop, or a desktop application, of the server computer 260 to the remote client application 220. The interactive window may be considered as a "picture" of the desktop or the desktop application. The remote client application 220 displays the interactive window on the display 214, so that the display 214 (if the remote client application 220 is running in full-screen mode), or a window on the display 214, looks like a desktop or window of the server computer 260. The user can then use the mouse 218 to move a cursor to a particular interactive element, such as for example an icon, and click on it to select it (or alternatively touch it with the touch screen 219). For example, if the user selects an icon for an application, such as for example a memo application, the remote server application 270 launches that application on the server 260 and causes its user interface to appear as an application window 272 in the interactive window presented to the client computer 210.

The user can interact with the various graphical elements of an application window 272 which is active (i.e. which has focus). These elements may include control elements such as, for example, radio buttons or check boxes, and may also include input elements, such as input element 274. In many cases, an input element allows entry by the user of alphanumeric text. In traditional computers, this text is entered using the physical keyboard of the client computer 210. However, if no physical keyboard exists, such as for a tablet computer or a smart phone, a virtual input device (such as a virtual keyboard) is instead used. Although window 272 is depicted within the server computer 260 for clarity of illustration, it is presented to the user on the display 214 of client computer 210, and corresponds to window 182 (FIG. 1).

In some examples, the client computer 210 includes a client-side virtual input device 230. While an application executing on the client computer 210 usually knows when the user has selected an input element of that client-side application and thus can automatically launch the client-side virtual input device 230, this is not the case for the input element 274 of the application executing on the server computer 260 in application window 272. The selection of the input element 274 is not known to the remote client application 220 because the application with which the user is interacting via window 272 is being executed on the server computer 260, not the client computer 210. As a result, the client-side virtual input device 230 cannot be automatically launched when the input element 274 is selected by the user.

In some examples, the server computer 260 includes a server-side virtual input device 285. In some examples, the server-side virtual input device 285 is a feature of the server OS 266. In addition, in some examples the application displayed in the window 272 can be aware that it is being interacted with from the client computer 210, rather than from the server computer 260 on which it is resident, and/or that the server OS 266 has a server-side virtual input device 285. If the server computer 260 includes a server-side virtual input device 285, and if the application knows that the server OS 266 includes the server-side virtual input device 285, then the server-side virtual input device 285 can be automatically launched when the input element 274 of the application displayed in the window 272 is selected by the user at the client computer 210. However, if the server computer 260 lacks a server-side virtual input device 285, and/or if the application is unaware that it is being interacted with from the client computer 210 and/or unaware that the server OS 266 has a server-side virtual input device 285, then the server-side virtual input device 285 cannot be automatically launched when the input element 274 is selected by the user. With regard to examples of operating systems usable as the server OS 266, Windows Server 2012, Windows 8, and Windows 10, among others, have a server-side virtual input device 285, while Windows Server 2008, Windows 7, and Windows XP, among others, do not. With regard to example applications, Microsoft Windows applications are grouped into "modern" applications designed for Windows 8 and newer operating systems which are virtual keyboard aware and can automatically launch the server-side virtual input device 285, and older "win32" or "desktop" applications which are not virtual keyboard aware and thus cannot automatically launch the server-side virtual input device 285. Modern applications which are virtual keyboard aware include, for example, Microsoft Store apps or Tile Apps (also known as metro apps), including such examples as the Office 365 application, or the Facebook application. Older "win32" or "desktop" applications which are not virtual keyboard aware include, for example, Microsoft Notepad and Microsoft Wordpad To automatically provide a virtual input device when needed even if the operating system and/or the application do not support one, the server computer 260 and the client computer 210 implement an auxiliary channel 255 between a server auxiliary channel module 290 in the server computer 260 and a client auxiliary channel module 240 in the client computer 210. In some examples, the auxiliary channel 255 is established after communications between the remote client application 220 and the remote server application 270 is established. In some examples, establishment of the auxiliary channel 250 is initiated by the server auxiliary channel module 290. The server auxiliary channel module 290 and the client auxiliary channel module 240 negotiate virtual input device preferences. During the negotiations, a priority order for use of the client-side virtual input device 230, the server-side virtual input device 285, and a client-side physical input device is obtained. In some examples, the priority order is obtained from at least one of the server auxiliary channel module 290 and the client auxiliary channel module 240. The negotiations further determine which of the client-side virtual input device 230, the server-side virtual input device 285, and a client-side physical input device exist. If the physical input device is the highest-priority existing device, then no device will be assigned as the virtual input device; the physical input device will be used. Otherwise, the highest-priority existing device (the client-side virtual input device 230 or the server-side virtual input device 285) is assigned to be used when an input element 274 is selected.

The server computer 260 also includes a virtual input device monitor 280. The virtual input device monitor 280 monitors, at path 276, interactions by the user of the client computer 210 over the main channel 250 with window 272 of the active application that is executing on the server computer 260 in order to detect a selection of an input element 274. In response to a selection, the virtual input device monitor 280 automatically causes a virtual input device to be displayed at the client computer 210 via the main channel 350. The particular virtual input device to be used is determined in accordance with the device preferences.

When the server-side virtual input device 285 is to be launched at path 282, the virtual input device monitor 280 may request the server OS 266 to do so.

When the client-side virtual input device 230 is to be launched at path 384, the virtual input device monitor 280 may automatically signal the guest auxiliary channel module 390 to cause this to occur. The client auxiliary channel module 240 receives an instruction from the server auxiliary channel module 290 over the auxiliary channel 255 to do so. In response, the client auxiliary channel module 240 launches, at path 242, the client-side virtual input device 230, in some examples by requesting the client OS 216 to do so. The host-side virtual input device 330 is automatically displayed locally at the host computing environment 310. Input from the client-side virtual input device 230 is sent to the remote client application 220 via path 232, and from the remote client application 220 to the active application via the main channel 250 and the remote server application 270.

The operation of the virtual input device monitor 280 is described subsequently in greater detail with reference to FIG. 5.

Figure 3:
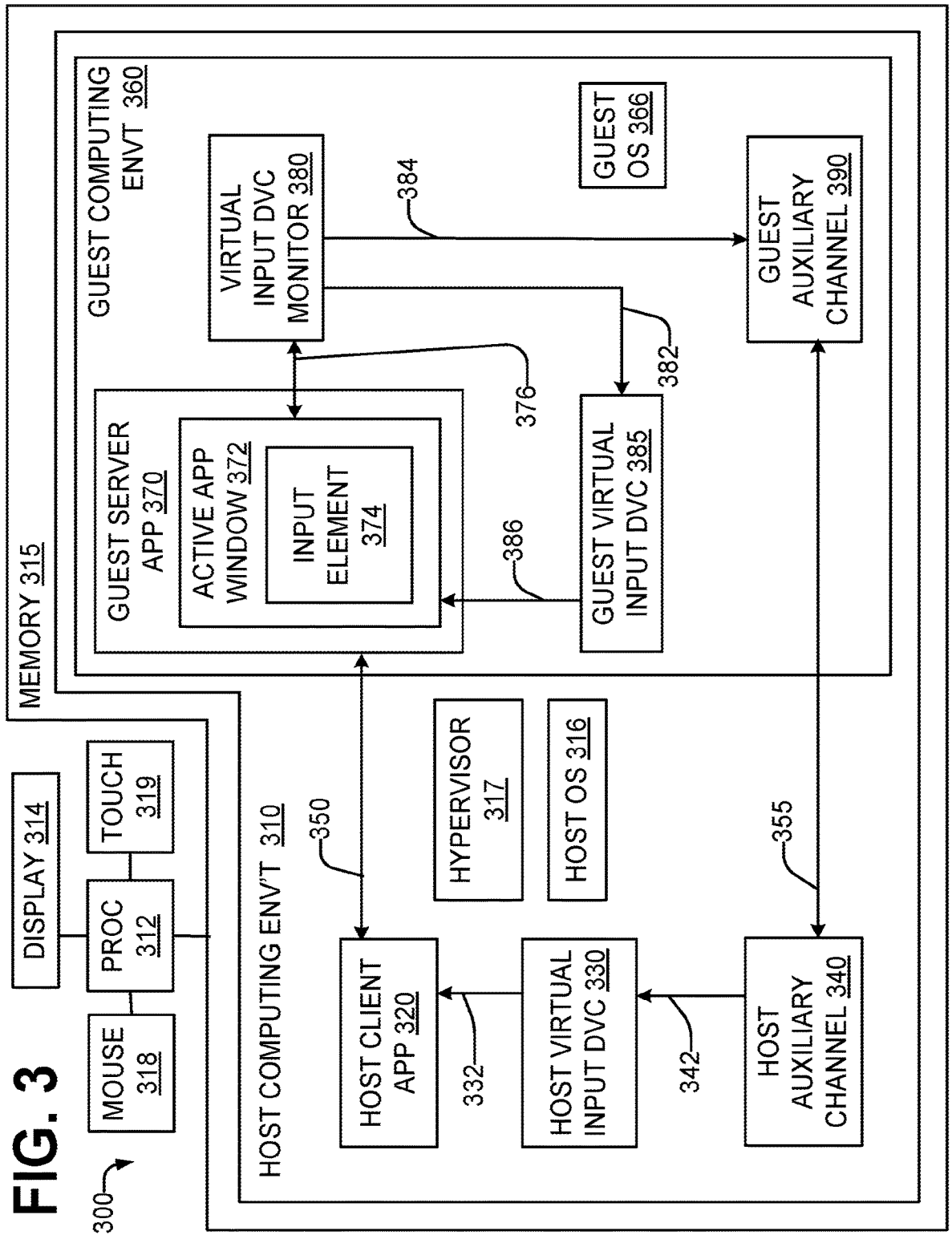
FIG. 3 is a schematic representation of the system of FIG. 1 in which the first computing environment is a guest computing environment and the second computing environment is a host computing environment in accordance with an example of the present disclosure.

Considering now a virtual machine-based system, and with reference to FIG. 3, a system 300 includes a host computing environment 310 communicatively coupled to a guest computing environment 360. The system 300 allows two different operating systems, such as for example Windows 10 and OS X, to run in different computing environments within a single computing device.

The host computing environment 310 includes a processor 312, which is coupled to a display 314, a mouse 318, a touch screen 319, and a memory 315. In some examples, the host computing environment 310 also includes a physical input device (not shown) which is also coupled to the processor 312. The memory 315 includes program instructions, which are executable by the processor 312, for various program modules, including a host operating system (host OS) 216 which may initiate and provide resources to other program modules in the memory 315. Also included in the memory 315 is the guest computing environment 360. The software modules of the guest computing environment 360 are executed by the same processor 312 which executes the software modules of the host computing environment 310. The guest computing environment 360 includes a guest operating system (guest OS) 366, which in many examples is a different type of operating system from the host OS 316. For example, one OS may be Windows XP, while another OS may be Windows 10. Or one OS may be Windows 7, while another OS may be Linux. In some examples, the host OS 316 and the guest OS 366 have different platforms. The guest OS 366 may initiate and provide resources to other program modules in the guest computing environment 360. In some examples, the host environment 310 also includes a hypervisor 317 which creates and runs the virtual machine (i.e. the guest computing environment 360). The guest environment 360 executes in a virtual machine "box" within the host environment 310.

The processor 312, display 314, mouse 318, touch screen 319, and memory 315, may be the same as, or similar to, the processor 212, display 214, mouse 218, touch screen 219, and memory 215 (FIG. 2) respectively.

The host computing environment 310 includes a host client application 320, and the guest computing environment 360 includes a guest server application 370. The host client application 320 and the guest server application 370 communicate over a main channel 350. In some examples, the main channel 350 is implemented by socket communications or by a virtual machine transceiver channel provided by the hypervisor 317 or other components. A non-limiting list of example host client applications 320 and guest server applications 370 include VMware, Virtual Box, and Parallel Desktop. Various host client applications 320 and guest server applications 370 operate with various operating systems.

In one example, the sockets or virtual machine transceivers implement, through connection 350, a desktop session between the host client application 320 and the guest server application 370. While the particulars may vary for different host client applications 320 and guest server applications 370, in a desktop session the guest server application 370 generally sends an interactive window of a desktop, or a desktop application, of the guest computing environment 360 to the host client application 320. The host client application 320 displays the interactive window on the display 314, so that the display 314 (if the host client application 320 is running in full-screen mode), or a window on the display 314, looks like a desktop or window of the guest computing environment 360. The user can then use the mouse 318 to move a cursor to a particular interactive element, such as for example an icon, and click on it to select it (or alternatively touch it with the touch screen 319). For example, if the user selects an icon for an application, such as for example a memo application, the guest server application 370 launches that application on the guest computing environment 360 and causes its user interface to appear as an application window 372 in the interactive window presented to the host computing environment 310.

The user can interact with the various graphical elements of an application window 372 which is active (i.e. which has focus). These elements may include control elements such as, for example, radio buttons or check boxes, and may also include input elements, such as input element 374. In many cases, an input element allows entry by the user of alphanumeric text. In traditional computers, this text is entered using the physical keyboard of the host computing environment 310. However, if no physical keyboard exists, such as for a tablet computer or a smart phone, a virtual input device (such as a virtual keyboard) is instead used. Although window 372 is depicted within the guest computing environment 360 for clarity of illustration, it is presented to the user on the display 314, and corresponds to window 182 (FIG. 1).

In some examples, the host computing environment 310 includes a host-side virtual input device 330. While an application executing on the host computing environment 310 usually knows when the user has selected an input element of that client-side application and thus can automatically launch the host-side virtual input device 330, this is not the case for the input element 374 of the application executing on the guest computing environment 360 and displayed in window 372. The selection of the input element 374 is not known to the host client application 320 because the application of window 372 with which the user in interacting is being executed on the guest computing environment 360, not the host computing environment 310. As a result, the host-side virtual input device 330 cannot be automatically launched when the input element 374 is selected by the user.

In some examples, the guest computing environment 360 includes a guest-side virtual input device 385. In some examples, the guest-side virtual input device 385 is a feature of the guest OS 366. In addition, in some examples the application displayed in the window 372 can be aware that it is being interacted with from the host computing environment 310, rather than from the guest computing environment 360 on which it is resident, and/or that the guest OS 366 has a guest-side virtual input device 385. If the guest computing environment 360 includes a guest-side virtual input device 385, and if the application knows that the guest OS 366 includes the guest-side virtual input device 385, then the guest-side virtual input device 385 can be automatically launched when the input element 374 of the application displayed in the window 272 is selected by the user at the host computing environment 310. However, if the guest computing environment 360 lacks a guest-side virtual input device 385, and/or if the application is unaware that it is being interacted with from the host computing environment 310 and/or unaware that the guest OS 366 has a guest-side virtual input device 385, then the guest-side virtual input device 385 cannot be automatically launched when the input element 374 is selected by the user. Examples of operating systems usable as the guest OS 366 include those operating systems discussed previously as being usable as the server OS 266 (FIG. 2). In addition, examples of modern applications which are virtual keyboard aware, and older applications which are not virtual keyboard aware, include the applications noted as modern applications and older applications respectively with regard to FIG. 2.

To automatically provide a virtual input device when needed even if the operating system and/or the application do not support one, the guest computing environment 360 and the host computing environment 310 implement an auxiliary channel 355 between a guest auxiliary channel module 390 in the guest computing environment 360 and a host auxiliary channel module 340 in the host computing environment 310. In some examples, the auxiliary channel 355 is established after communications between the host client application 320 and the guest server application 370 is established. In some examples, establishment of the auxiliary channel 355 is initiated by the guest auxiliary channel module 390. The guest auxiliary channel module 390 and the host auxiliary channel module 340 negotiate virtual input device preferences. During the negotiations, a priority order for use of the host-side virtual input device 330, the guest-side virtual input device 385, and a host-side physical input device is obtained. In some examples, the priority order is obtained from at least one of the guest auxiliary channel module 390 and the guest auxiliary channel module 340. The negotiations further determine which of the host-side virtual input device 330, the guest-side virtual input device 385, and a client-side physical input device exist. If the physical input device is the highest-priority existing device, then no device will be assigned as the virtual input device; the physical input device will be used. Otherwise, the highest-priority existing device (the host-side virtual input device 330 or the guest-side virtual input device 385) is assigned to be used when an input element 374 is selected.

The guest computing environment 360 also includes a virtual input device monitor 380. The virtual input device monitor 380 monitors, at path 376, interactions by the user of the host computing environment 310 over the main channel 350 with the active application that is executing on the guest computing environment 360 and displayed in window 372 in order to detect a selection of an input element 374. In response to a selection, the virtual input device monitor 380 automatically causes a virtual input device to be displayed at the host computing environment 310 via the main channel 350. The particular virtual input device to be used is determined in accordance with the device preferences.

When the guest-side virtual input device 385 is to be launched at path 382, the virtual input device monitor 380 may request the guest OS 366 to do so.

When the host-side virtual input device 330 is to be launched at path 384, the virtual input device monitor 380 may automatically signal the guest auxiliary channel module 390 to cause this to occur. The host auxiliary channel module 340 receives an instruction from the guest auxiliary channel module 390 over the auxiliary channel 355 to do so. In response, the host auxiliary channel module 340 launches, at path 342, the host-side virtual input device 330, in some examples by requesting the host OS 316 to do so. The host-side virtual input device 330 is automatically displayed locally at the host computing environment 310. Input from the host-side virtual input device 330 is sent to the host client application 320 via path 332, and from the host client application 320 to the active application via the main channel 350 and the guest server application 370.

The operation of the virtual input device monitor 380 is described subsequently in greater detail with reference to FIG. 5.

Figure 4:
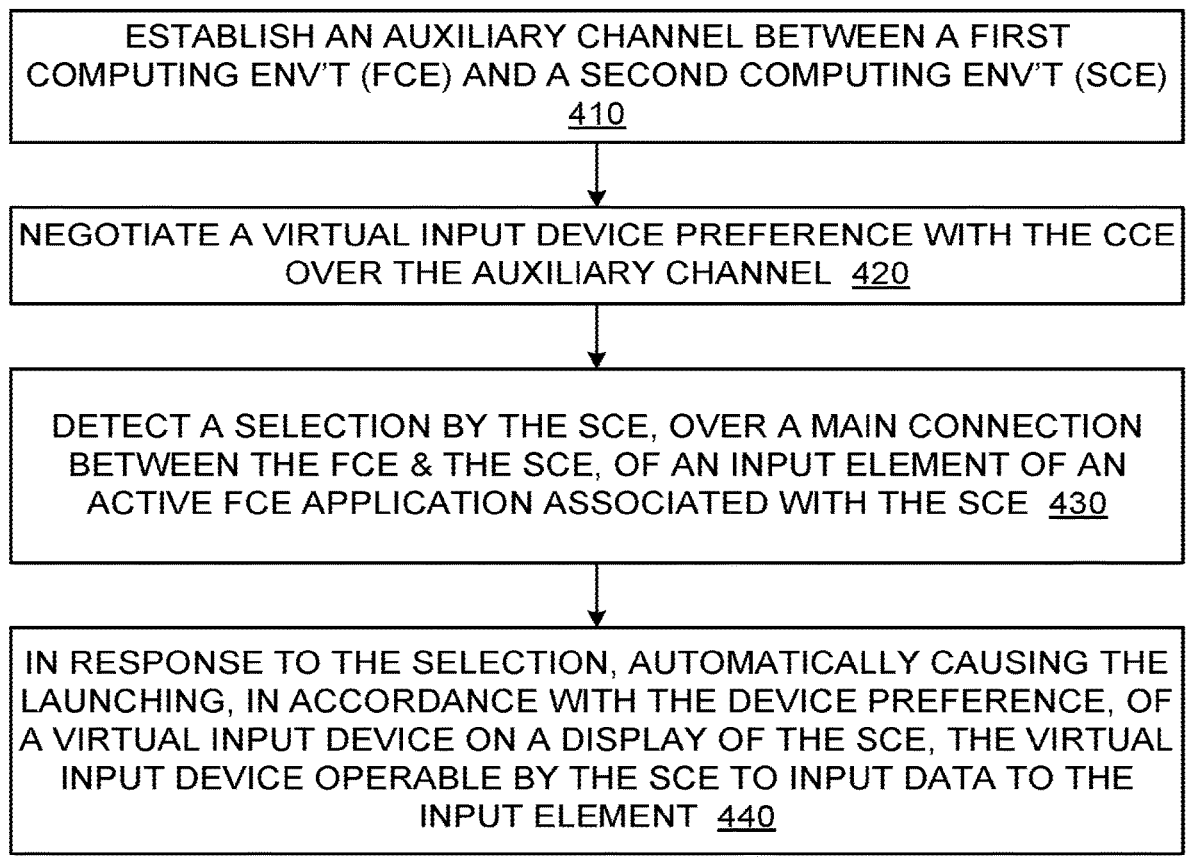
FIG. 4 is a flowchart according to an example of the present disclosure of a method for a first computing environment to automatically display a virtual input device on a display of a second computing environment.

Considering now a method for a first computing environment (FCE) to automatically display a virtual input device on a display of a second computing environment (SCE) which is communicatively coupled to the FCE via a main channel, and with reference to FIG. 4, a method 400 begins, at 410, by establishing an auxiliary channel between the FCE and the SCE. At 420, a virtual input device preference is negotiated by the FCE and the SCE over the auxiliary channel. At 430, a selection by the SCE, over the main channel, of an input element of an active FCE application which is associated with the SCE is detected. In one example, an active FCE application associated with the SCE is an application executed on the FCE in a remote session with a user at the SCE, and the user makes the selection. At 440, in response to the selection, the launching, in accordance with the device preference, of a virtual input device operable by the SCE to input data to the input element is automatically caused.

Figure 5:
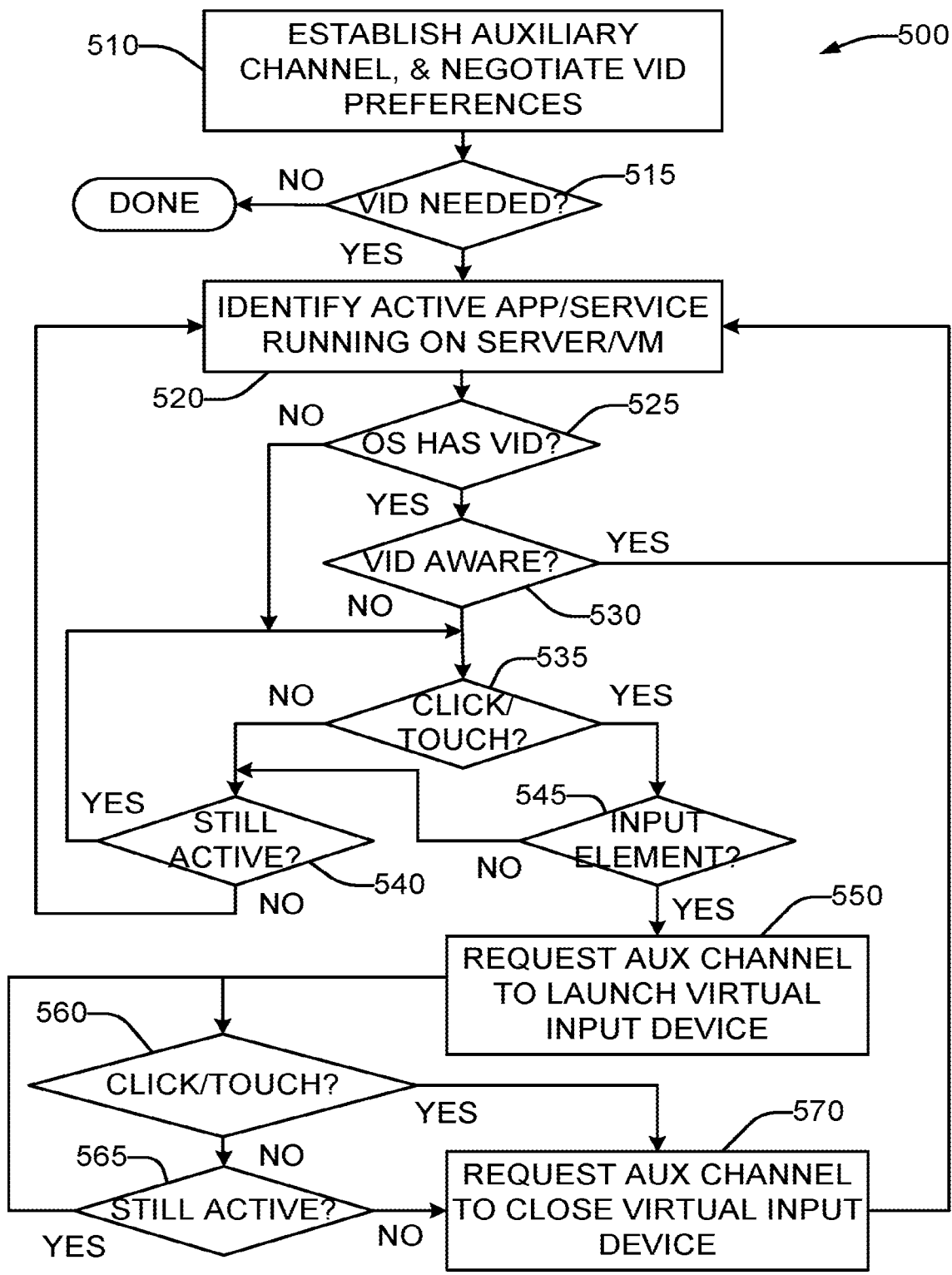
FIG. 5 is a flowchart according to an example of the present disclosure of a virtual input device monitor usable with the method of FIG. 4.

Consider now, with reference to FIG. 5, a flowchart of a virtual input device monitor. The virtual input device monitor may be the monitor module 150 (FIG. 1), monitor 280 (FIG. 2), and/or monitor 380 (FIG. 3). The flowchart of FIG. 5 may additionally or alternatively be considered as at least a portion of a method implemented in the server computer 260 (FIG. 2) or guest computing environment 360.

A method 500 begins, at 510, by establishing an auxiliary channel and negotiating user preferences for a virtual input device, as is discussed subsequently with reference to FIGS. 8-9. At 515, it is determined whether a virtual input device is to be used. For example, if the negotiated preferences indicate that a physical keyboard exists on a client computer or a host computing environment and is to be used instead of a virtual input device, then the method stops ("No" branch of 515). Otherwise ("Yes" branch of 515), the method continues at 520 where an active application executing on the server computer or guest computing environment is identified. The active application (such as application 160 of FIG. 1, for example) is displayed in application window 274 (FIG. 2) or application window 374 (FIG. 3). In some examples, the active application is identified by querying the server/guest OS to identify the application which currently has focus (i.e. it is the one currently capable of being interacted with). At 525, it is determined whether the server/guest OS has a virtual input device. In some examples, this is done by querying the server/guest OS as to whether a registered virtual keyboard device exists (if the virtual keyboard is launched like a standard application), or checking if the API to launch a virtual keyboard exists. If the server/guest OS does have a virtual input device ("Yes" branch of 525), then at 530 it is determined whether the active application is an application which is aware that the server/guest operating system has a server-side/guest-side virtual input device, and/or that the application is being interacted with from a different computing environment than the computing environment in which the application is executing. In some examples, this determination is made by identifying the class of the active application, which is different for applications which have this awareness and for those which do not. In some examples, it is done by determining whether the application has a process handle and an associated executable as unaware applications do. Unaware applications may be older or "legacy" applications that assume they are running in a desktop computer environment. If the application is aware ("Yes" branch of 530), then the method loops back to 520 to await another application becoming active because the currently active application itself manages use of the virtual input device.

If the application is an unaware application ("No" branch of 530), or if the server/guest OS does not have a virtual input device ("No" branch of 525), then at 535 it is determined if a click or touch event has occurred within the active application window. In one example, the monitor registers with the server/guest OS to receive notification of such click or touch events. If no click or touch event has occurred ("No" branch of 535), then at 540 it is determined whether the application remains the active application. If so ("Yes" branch of 540), the method loops to await a click or touch event. If not ("No" branch of 540), the method returns to 520 to identify the application which is now the active application.

If a click or touch event has occurred ("Yes" branch of 535), then at 545 is it determined whether that click or touch event is for an input element, such as for example input element 274 (FIG. 2), 374 (FIG. 3). In some examples, the clicked or touched element of the active application window is inspected to determine whether it is an input element, such as an editable element, or a text box which is not read-only. If not ("No" branch of 545, the flow branches to 540. If the click or touch event is for an input element ("Yes" branch of 545), then at 550 a request is issued to an auxiliary channel module to launch the virtual input device in accordance with the negotiated preferences. The auxiliary channel module may be the server auxiliary channel module 290 (FIG. 2) or the guest auxiliary channel module 390 (FIG. 3). The operation of the auxiliary channel module is described subsequently in greater detail with reference to FIG. 6.

After the request is issued at 500, it is determined at 560 whether another click or touch event has occurred within the active application window. If not ("No" branch of 565), then at 565 it is determined whether the application remains the active application. If so ("Yes" branch of 565), the method loops to 560 to await a click or touch event. If not ("No" branch of 565), then at 570 a request is issued to the auxiliary channel module to close the virtual input device. The flow then returns to 520.

Figure 6:
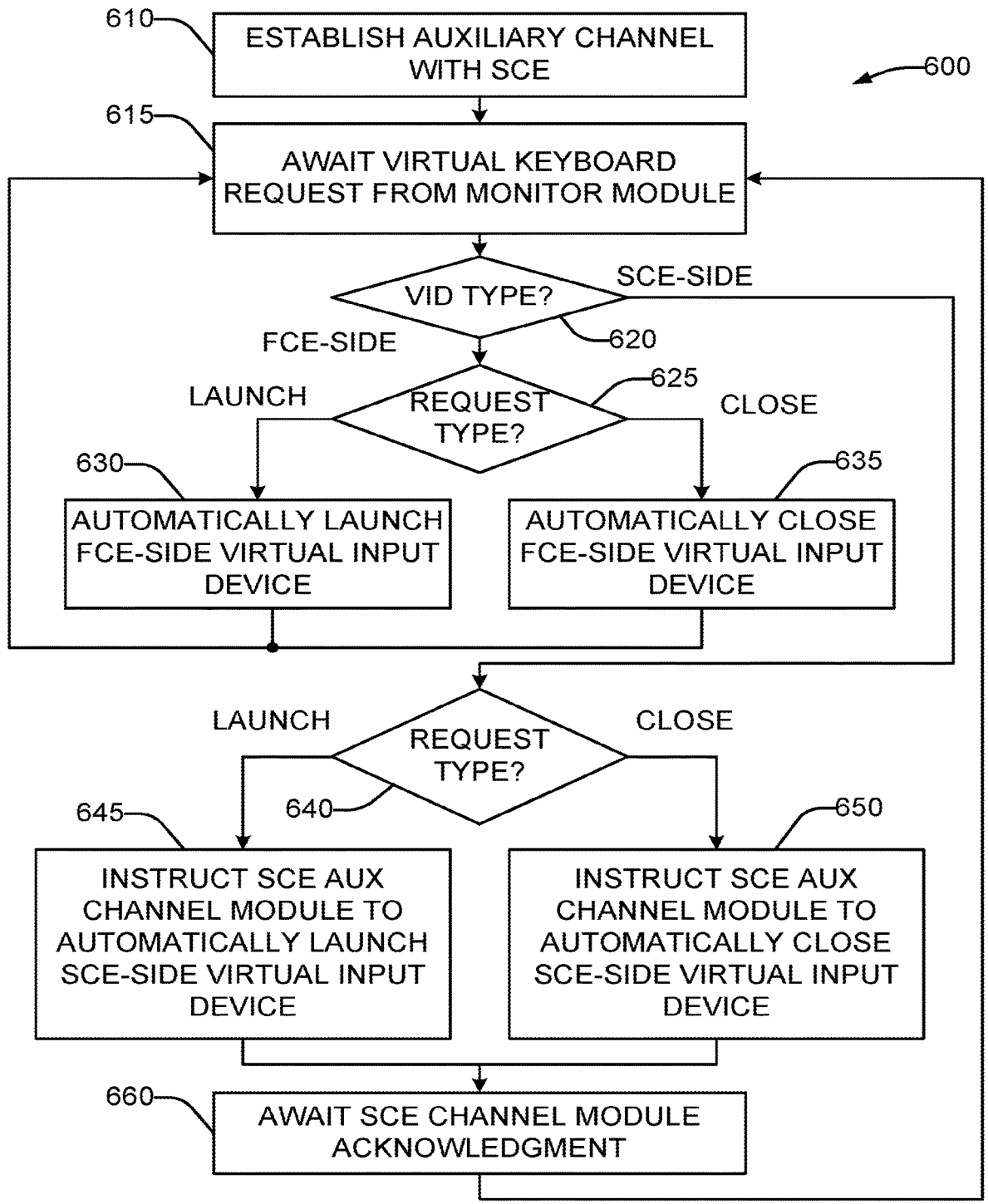
FIG. 6 is a flowchart according to an example of the present disclosure of a method of an auxiliary channel control module of the first computing environment usable with the method of FIG. 4.

Consider now, with reference to FIG. 6, a flowchart of an auxiliary channel module. The auxiliary channel module may be the auxiliary channel module 140 (FIG. 1) of the first computing environment 110, the server auxiliary channel module 290 (FIG. 2) of the server computer 260, and/or the guest auxiliary channel module 390 (FIG. 3) of the guest computing environment 360. The flowchart of FIG. 6 may additionally or alternatively be considered as at least a portion of a method implemented in the first computing environment 110, server computer 260, or guest computing environment 360.

A method 600 begins, at 610, by the auxiliary channel module establishing an auxiliary channel with a corresponding auxiliary channel module in a different computing environment, and negotiating user preferences for a virtual input device, as is discussed subsequently with reference to FIGS. 8-9. At 615, a virtual device request from a virtual input device monitor module is awaited. When such a request is received, then at 620 it is determined the type of virtual input device to be launched. This may be determined from the negotiated user preferences. If the virtual input device of the same computing environment (server computer 260 or guest computing environment 360) in which the monitor resides ("FCE-side" branch of 620) is to be launched, then at 625 the type of request received from the monitor is determined. In some examples, the type is passed with the request. If the request is to launch the virtual input device ("Launch" side of 625), then at 630 the auxiliary channel module automatically launches the FCE-side virtual input device (e.g. server virtual input device 285 or guest virtual input device 385). If the request is to close the virtual input device ("Close" side of 625), then at 630 the auxiliary channel module automatically closes the FCE-side virtual input device. In one example, the FCE-side virtual input device is launched or closed by making an API call, or providing a signal, to an operating system of the FCE (e.g. the server OS 266 or guest OS 366). While in the examples of FIGS. 5-6 the FCE-side virtual input device is launched or closed by the FCE auxiliary channel module, in other examples the FCE-side virtual input device is launched or closed by the virtual device monitor module instead.

If the virtual input device of a different computing environment (client computer 210 or host computing environment 310) from the one in which the monitor resides ("SCE-side" branch of 620) is to be launched, then at 640 the type of request received from the monitor is determined. In some examples, the type is passed with the request. If the request is to launch the virtual input device ("Launch" side of 640), then at 645 the auxiliary channel module in the same computing environment as the monitor (auxiliary channel module 140, server auxiliary channel module 290, or guest auxiliary channel module 390) instructs the auxiliary channel module in the different computing environment (client auxiliary channel module 240, or host auxiliary channel module 340) to automatically launch the client virtual input device 230 (FIG. 2) or host virtual input device 330 (FIG. 3). If the request is to close the virtual input device ("Close" side of 640), then at 650 the auxiliary channel module in the same computing environment as the monitor instructs the auxiliary channel module in the different computing environment to automatically close the client virtual input device 230 (FIG. 2) or host virtual input device 330 (FIG. 3). At 650, the auxiliary channel module in the monitor computing environment awaits an acknowledgment from the auxiliary channel module in the different computing environment that the virtual keyboard has been launched or closed, as requested.

Figure 7:
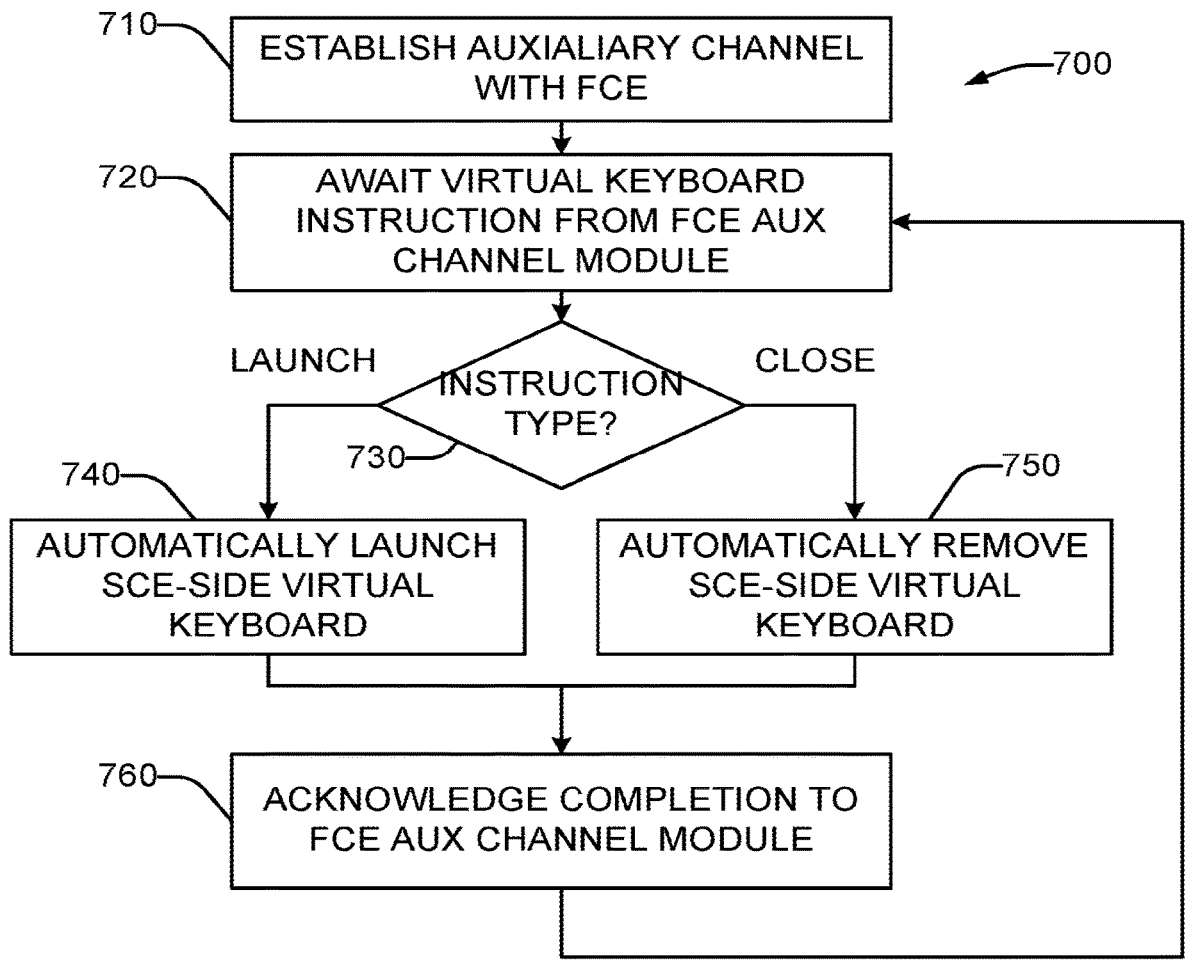
FIG. 7 is a flowchart according to an example of the present disclosure of a method of an auxiliary channel control module of the second computing environment usable with the method of FIG. 4.

Consider now, with reference to FIG. 7, a flowchart of another auxiliary channel module which is complementary to, and may be used in conjunction with, the auxiliary channel module of FIG. 6. The auxiliary channel module may be the client auxiliary channel module 240 (FIG. 2) of the client computer 210, and/or the host auxiliary channel module 340 (FIG. 3) of the host computing environment 310. The flowchart of FIG. 7 may additionally or alternatively be considered as at least a portion of a method implemented in the second computing environment 170, client computer 210, or host computing environment 310.

A method 700 begins, at 710, by the auxiliary channel module establishing an auxiliary channel with a complementary auxiliary channel module in a different computing environment, and negotiating user preferences for a virtual input device, as is discussed subsequently with reference to FIGS. 8-9. At 720, a virtual device instruction from the complementary auxiliary channel module is awaited. When such an instruction is received, its type is determined. In some examples, the type is passed with the instruction.

If the instruction is to launch the virtual input device ("Launch" side of 730), then at 740 the auxiliary channel module automatically launches the virtual device 185 (FIG. 1), the client virtual input device 230 (FIG. 2), or the host virtual input device 330 (FIG. 3). If the request is to close the virtual input device ("Close" side of 625), then at 630 the auxiliary channel module automatically closes the virtual device 185 (FIG. 1), the client virtual input device 230 (FIG. 2), or the host virtual input device 330 (FIG. 3). At 760, the auxiliary channel module acknowledges the completion of the instructed launch or close operation to the complementary auxiliary channel module in the different computing environment.

Figure 8:
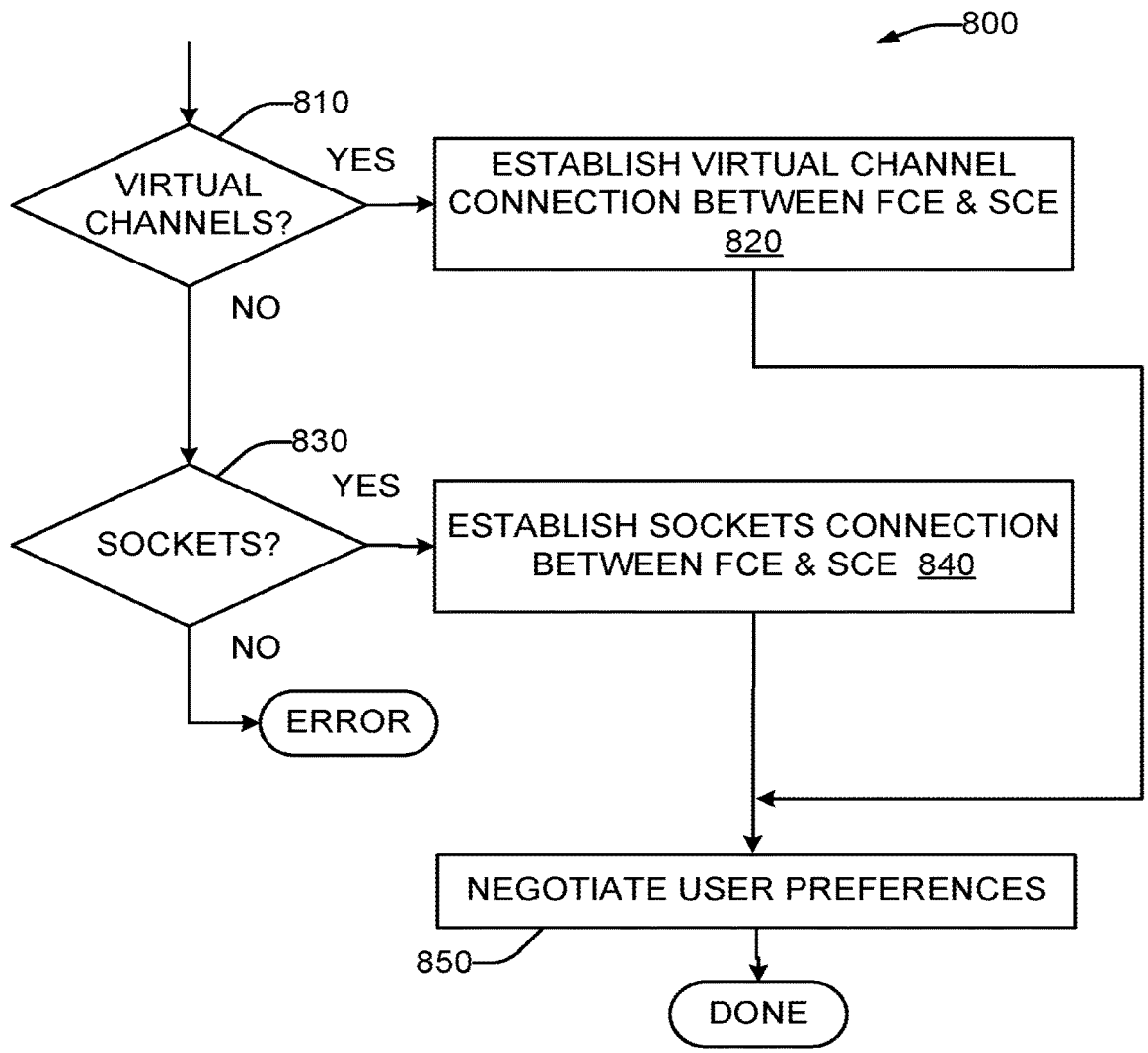
FIG. 8 is a flowchart according to an example of the present disclosure of a method for establishing an auxiliary channel for a virtual input device usable with the method of FIG. 4.

Consider now, with reference to FIG. 8, a method of establishing an auxiliary channel for a virtual input device. The flowchart of FIG. 8 may additionally or alternatively be considered as at least a portion of an auxiliary channel module. The auxiliary channel module may be the auxiliary channel module 140 (FIG. 1) of the first computing environment 110, the server auxiliary channel module 290 (FIG. 2) of the server computer 260, and/or the guest auxiliary channel module 390 (FIG. 3) of the guest computing environment 360.

The method begins at 810 by determining whether a different computing environment supports virtual channel connections. The different computing environment may be the second computing environment 110, the client auxiliary channel module 240 (FIG. 2) of the client computer 210, and/or the host auxiliary channel module 340 (FIG. 3) of the host computing environment 310. In some examples, the determination is made by ascertaining whether a plug-in for a particular virtual channel protocol exists on for the first and second computing environments. For example, the computing environment may attempt to establish a virtual channel connection with the different computing environment using all the virtual channel protocols supported by the computing environment. If the different computing environment supports virtual channels ("Yes" branch of 810), then at 820 a virtual channel connection for the auxiliary channel is established between the two auxiliary channel modules of the two computing environments.

If the different computing environment does not support virtual channels ("No" branch of 810), then at 830 it is determined whether the different computing environment supports socket connections. In some examples, the determination is made by the computing environment attempting to establish a direct socket connection with the different computing environment. In a client-server system (e.g. FIG. 2), the connection is a network socket connection. In a virtual machine system (e.g. FIG. 3), the connection is a socket connection. If the different computing environment supports sockets ("Yes" branch of 830), then at 840 a sockets connection for the auxiliary channel is established between the two auxiliary channel modules of the two computing environments. If the different computing environment does not support network sockets ("No" branch of 830), then an error occurs.

After block 820 or block 840 is performed, user preferences for the virtual input device are negotiated at 850, and the method ends.

Figure 9:
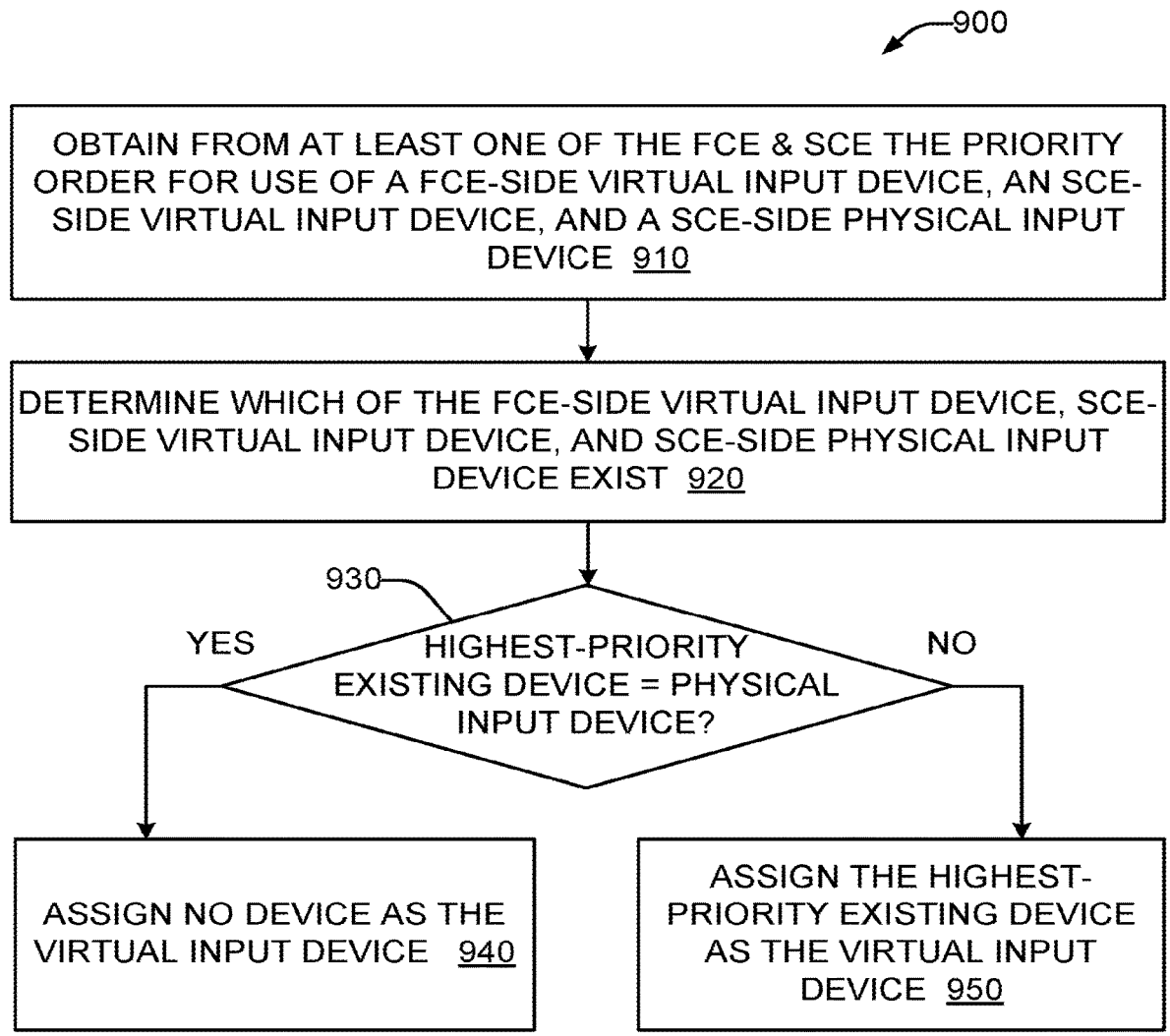
FIG. 9 is a flowchart according to an example of the present disclosure of a method for negotiating user preferences for a virtual input device usable with the method of FIG. 4.

Consider now, with reference to FIG. 9, a method of negotiating user preferences for a virtual input device. The flowchart of FIG. 9 may additionally or alternatively be considered as at least a portion of an auxiliary channel module. The auxiliary channel module may be the auxiliary channel module 140 (FIG. 1) of the first computing environment 110, the server auxiliary channel module 290 (FIG. 2) of the server computer 260, and/or the guest auxiliary channel module 390 (FIG. 3) of the guest computing environment 360. The auxiliary channel connects two computing environments. The second computing environment may be the second computing environment 170 (FIG. 1), the client auxiliary channel module 240 (FIG. 2) of the client computer 210, and/or the host auxiliary channel module 340 (FIG. 3) of the guest computing environment 310.

A method 900 begins at 910 by obtaining over the auxiliary channel, from at least one of the two computing environments, a priority order for use of input devices in conjunction with interactions over a main channel, such as main channel 150 (FIG. 1), 250 (FIG. 2), 350 (FIG. 3) between the two computing environments. In one example, a predefined priority order may be obtained. In one example, the priority order ranks in a desired order of use a virtual input device in at least one of the computing environments and a physical input device, such as a physical keyboard, in the second computing environment. In one example, a priority order is obtained from one of the two computing environments. In another example, a different priority order is obtained from both computing environments and conflicts in priority are resolved according to a predetermined algorithm. At 920, it is determined which of the input devices exist in the two computing environments. At 930, if the highest-priority device which exists is the physical input device ("Yes" branch of 930), then at 940 no device is assigned as the virtual input device. In other words, the physical input device will be used when a click or touch event occurs for an input element. If the highest-priority device which exists is not the physical input device ("No" branch of 930), then at 950 the highest-priority existing device is assigned as the virtual input device for use when a click or touch event occurs for an input element.

In some examples, at least one block or step discussed herein is automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

From the foregoing it will be appreciated that the computing environment, medium, and method provided by the present disclosure represent a significant advance in the art. Although several specific examples have been described and illustrated, the disclosure is not limited to the specific methods, forms, or arrangements of parts so described and illustrated. For example, while in one example the virtual input device is a virtual keyboard, in other examples it can be another arrangement of virtual control buttons, such as a virtual numeric keypad, an ink pad (virtual pad) which generates characters or words, or other devices. The foregoing examples are illustrative, and different features or elements may be included in various combinations that may be claimed in this or a later application. Unless otherwise specified, operations of a method claim need not be performed in the order specified. Similarly, blocks in diagrams or numbers (such as (110), (120), etc.) should not be construed as limited to operations that proceed in a particular order. Additional blocks/operations may be added, some blocks/operations removed, or the order of the blocks/operations altered and still be within the scope of the disclosed examples. Further, methods or operations discussed within different figures can be added to or exchanged with methods or operations in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of at least one such element, neither requiring nor excluding two or more such elements. Where the claims recite "having", the term should be understood to mean "comprising".

What is claimed is:

1. A first computing environment (FCE), comprising:
a processor; and
a memory communicatively coupled to the processor and including instructions executable by the processor for
an auxiliary channel module to establish an auxiliary channel between the FCE and a second computing environment (SCE), the auxiliary channel different from a main channel connection between the FCE and the SCE, and to negotiate virtual input device display preferences with the SCE by:
if a SCE-side physical input device is a highest priority input device that is present, not assigning a virtual input device;
if the SCE-side physical input device is not the highest priority input device that is present, assigning the virtual input device as a FCE-side virtual input device or a SCE-side virtual input device that is the highest priority input device that is present, and
a monitor module to, if the virtual input device has been assigned, detect a selection, by the SCE over the main channel, of an input element of an application executing on the FCE and displayed in an interactive window of the SCE, and in response automatically cause the virtual input device, in accordance with the display preferences, to be displayed at the SCE.

2. The first computing environment of claim 1, wherein an operating system of the FCE does not include the FCE-side virtual input device.

3. The first computing environment of claim 1, wherein the application executing on the FCE does not support the virtual input device.

4. The first computing environment of claim 1, wherein an operating system of the FCE has a different platform from an operating system of the SCE.

5. A method for a first computing environment (FCE) to automatically display the virtual input device on a display of a second computing environment (SCE) communicatively coupled to the FCE via a main channel, comprising:
  establishing an auxiliary channel between the FCE and the SCE;
  negotiating a virtual input device preference with the SCE over the auxiliary channel by:
    if a SCE-side physical input device is a highest priority input device that is present, not assigning the virtual input device;
    if the SCE-side physical input device is not the highest priority input device that is present, assigning the virtual input device as a FCE-side virtual input device or a SCE-side virtual input device that is the highest priority input device that is present;
  if the virtual input device has been assigned:
    detecting a selection by the SCE, over the main channel, of an input element of an active FCE application associated with the SCE; and
    in response to the selection, automatically causing the launching, in accordance with the device preference, of the virtual input device operable by the SCE to input data to the input element.

6. The method of claim 5, wherein
  the input element is an alphanumeric entry control of a graphical user interface presented by the active FCE application, and
  the selection is a click event or touch event for the alphanumeric entry control.

7. The method of claim 5, wherein the automatically launching comprises:
  if the device preference is the FCE-side virtual input device, instructing an operating system of the FCE to launch the FCE-side virtual input device; and
  if the device preference is the SCE-side virtual input device, issuing an instruction to the SCE over the auxiliary channel to launch the SCE-side virtual input device.

8. The method of claim 5, comprising:
  after the launching, detecting a selection by the SCE of an additional element of the active FCE application, or an activation of a different FCE application; and
  in response to the selection or the activation, automatically closing the virtual input device.

9. A non-transitory computer-readable storage medium having an executable program stored thereon, wherein the program instructs a processor of a first computing environment (FCE) to:
  establish an auxiliary channel with a second computing environment (SCE), the auxiliary channel different from a main channel with the second computing environment;
  negotiate virtual input device preferences with the SCE over the auxiliary channel by:
    if a SCE-side physical input device is a highest priority input device that is present, not assigning a virtual input device;
    if the SCE-side physical input device is not the highest priority input device that is present, assigning the virtual input device as a FCE-side virtual input device or a SCE-side virtual input device that is the highest priority input device that is present;
  if the virtual input device has been assigned:
    monitor interactions by the SCE, over the main channel, with an application executing on the FCE to detect a selection of an input element of the application; and
    automatically cause the virtual input device, in accordance with the device preferences, to be displayed at the SCE in response to the selection.

10. The medium of claim 9, wherein the display preferences specify use of the SCE-side virtual input device and wherein, to automatically display the SCE-side virtual input device, the program further instructs the processor to:
  automatically issue a request to the SCE over the auxiliary channel to launch the SCE-side virtual input device, the SCE displaying the SCE-side virtual input device locally on the SCE in response.

11. The medium of claim 9, wherein the display preferences specify use of the FCE-side virtual input device and wherein, to automatically display the FCE-side virtual input device, the program further instructs the processor to:
  automatically launch the FCE-side virtual input device on the FCE, the FCE-side virtual input device displayed at the SCE via the main channel.

12. The medium of claim 9, wherein, to establish the auxiliary channel, the program further instructs the processor to:
  establish a virtual channel as the auxiliary channel if the SCE supports virtual channels; and
  establish a socket connection as the auxiliary channel if the SCE supports network sockets but does not support virtual channels.

13. The medium of claim 9, wherein the FCE is a server, the SCE is a client, and the main channel uses a remote desktop communications protocol (RDCP).

14. The medium of claim 9, wherein the FCE is a guest virtual machine, the SCE is a host machine, and the main channel implements virtualization of the FCE on the SCE.

* * * * *